United States Patent
Krishnapandi et al.

(10) Patent No.: US 12,513,629 B2
(45) Date of Patent: Dec. 30, 2025

(54) BETTER CONNECTIVITY EXPERIENCE BY NORMALIZING TRANSMIT POWER IMBALANCE

(71) Applicant: Avago Technologies International Sales Pte. Limited, Singapore (SG)

(72) Inventors: Pandiyaraja Krishnapandi, Bengaluru (IN); Sandeep Kumar, Bengaluru (IN); Mahesh H K Dutta, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 453 days.

(21) Appl. No.: 17/993,783

(22) Filed: Nov. 23, 2022

(65) Prior Publication Data

US 2024/0172135 A1 May 23, 2024

(51) Int. Cl.
*H04W 52/36* (2009.01)
*H04B 17/318* (2015.01)
*H04W 36/30* (2009.01)
*H04W 48/20* (2009.01)
*H04W 52/24* (2009.01)

(52) U.S. Cl.
CPC ........ *H04W 52/367* (2013.01); *H04B 17/318* (2015.01); *H04W 36/30* (2013.01); *H04W 48/20* (2013.01); *H04W 52/245* (2013.01)

(58) Field of Classification Search
CPC ... H04W 52/367; H04W 36/30; H04W 48/20; H04W 52/245; H04B 17/318
See application file for complete search history.

(56) References Cited

U.S. PATENT DOCUMENTS

| | | | |
|---|---|---|---|
| 7,466,678 B2 * | 12/2008 | Cromer | H04W 12/06 455/450 |
| 7,760,681 B1 | 7/2010 | Chhabra | |
| 11,606,791 B1 * | 3/2023 | Tsai | H04W 72/0453 |
| 2006/0135066 A1 | 6/2006 | Banerjea | |

(Continued)

FOREIGN PATENT DOCUMENTS

EP  1 235 366 A1  8/2002
WO  WO 2016/192224  12/2016

OTHER PUBLICATIONS

Extended European Search Report on Ep Appln. 23209179.3 dated Apr. 9, 2024.

*Primary Examiner* — Asad M Nawaz
*Assistant Examiner* — Hugh Mark Ashley
(74) *Attorney, Agent, or Firm* — Foley & Lardner LLP

(57) ABSTRACT

An integrated circuit for an electronic device includes a memory and a controller. The memory stores instructions, and the controller circuitry operatively couples to the memory. Executing the instructions causes the controller circuitry to obtain a first and a second normalized RSSI, compare the first normalized RSSI with the second normalized RSSI, and select, from the first network device and the second network device, a network device associated with a greater of the first normalized RSSI and the second normalized RSSI. The first normalized RSSI includes a first difference between a first Tx power value of a first network device and an electronic device Tx power. The second normalized RSSI includes a second difference between a second Tx power value of a second network device and the electronic device Tx power.

20 Claims, 5 Drawing Sheets

(56) References Cited

U.S. PATENT DOCUMENTS

| | | | |
|---|---|---|---|
| 2013/0250875 A1* | 9/2013 | Chen | H04W 52/365 |
| | | | 370/329 |
| 2020/0374810 A1* | 11/2020 | Hart | H04W 52/343 |
| 2022/0383881 A1* | 12/2022 | Shahbazi Mirzahasanloo | ............ |
| | | | G10L 19/005 |

* cited by examiner

BETTER CONNECTIVITY EXPERIENCE BY NORMALIZING TRANSMIT POWER IMBALANCE

TECHNICAL FIELD

The present description relates generally to data communications hardware including, for example, better connectivity experience by normalizing transmit-power imbalance.

BACKGROUND

In an IEEE 802.11 infrastructure basic service set, the received signal strength indicator (RSSI) is computed for a station (STA) could vary based on the transmit power used at transmitting station and path loss, and/or a distance between the transmitting station and the receiving station. The transmit power for the access points (APs) and client stations could vary depending on the country and/or regulatory limits, hardware, and/or board limits and the channel mode, and/or usage as described in IEEE 802.11 specification under section 11.7.6.

According to section 11.7.6. of the IEEE 802.11 specification, a STA may select any transmit power for transmissions in a channel within the following three constraints. First, an STA shall determine a regulatory maximum transmit power, and a local maximum transmit power for a channel in the current regulatory domain before transmitting in the channel. Second, an AP shall use a transmit power less than or equal to the regulatory maximum transmit power level for the channel; the AP shall also meet any regulatory mitigation requirement. Third, a non-access point client station shall use a transmit power less than or equal to the local maximum transmit power level for the channel.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

Figure 1:
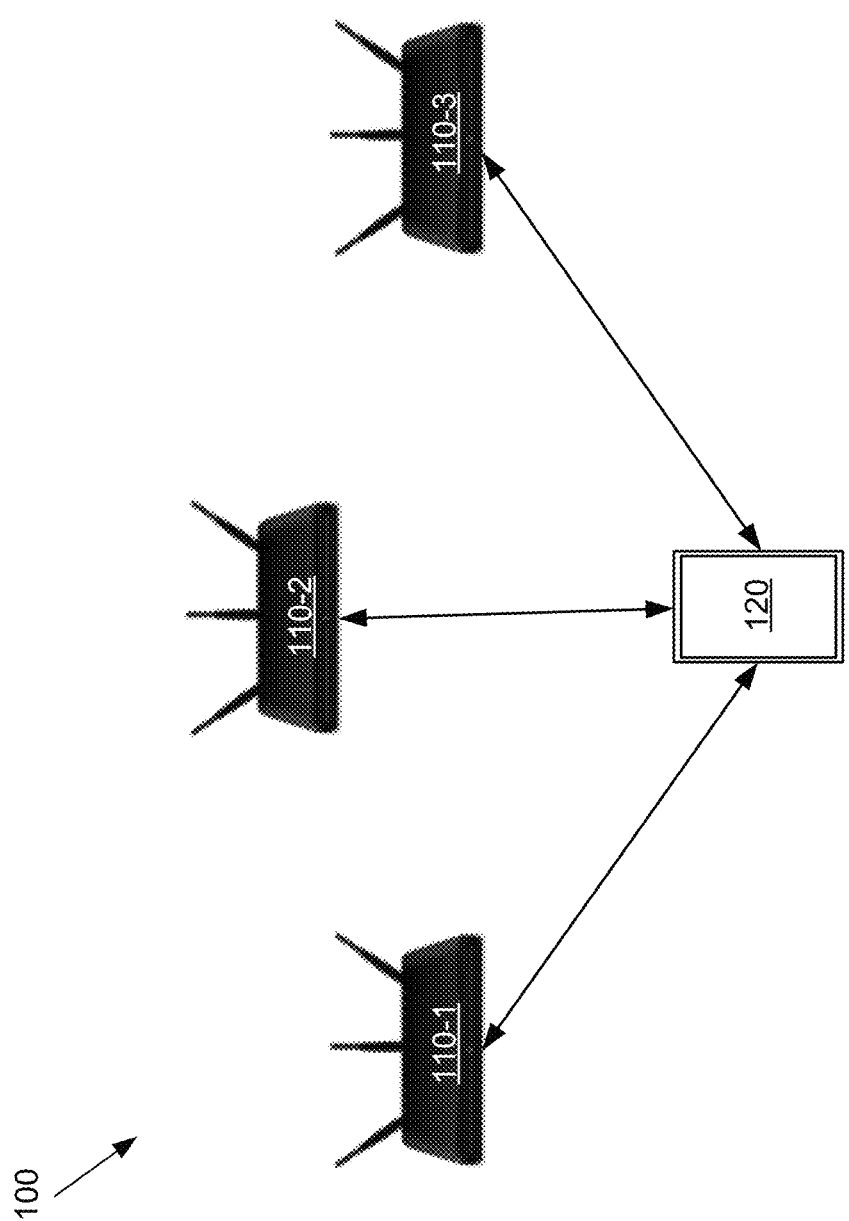
FIG. 1 is a block diagram illustrating a wireless environment within which some aspects of the subject technology are implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

According to some aspects of the subject technology, the subject technology is directed to an enhanced connectivity experience by overcoming a transmit-power imbalance between an electronic device and two or more network devices. An electronic device described herein may include a STA, such as a mobile wireless communication device (e.g., smartphone, tablet computing device), as non-limiting examples. A network device described herein may include an access point (AP), as a non-limiting example.

One traditional solution in a STA includes receiving a received-signal strength indicator (RSSI) from each available AP and selecting (e.g., connects to) the AP with the highest RSSI among the APs. Based on the Tx power imbalance (e.g., AP having a higher Tx power than the STA Tx power), the STA may not successfully transmit all data packets or frames to the selected AP. However, the STA of the subject technology can compute a normalized parameter, and select, based upon the normalized parameter, an AP to which a radio circuit(s) of the STA can connect. The term "normalize" or "normalization" refers to converting or reducing values to a common standard. For example, an RSSI value of an AP can be normalized by subtracting a Tx power (or power value) from the AP and the Tx power from the STA from an actual RSSI from the AP. In this manner, the STA can determine a normalized RSSI for each AP and select the AP with the highest normalized RSSI among the APs. Beneficially, the normalization of the RSSI may overcome power imbalance issues between the AP and the STA, and assist the STA in selecting an AP to which the STA can reliably transmit data packets or frames. Additionally, the normalized RSSI can be used for making roam decisions and target AP selections while roaming or joining the infrastructure basic service set (BSS) networks created by a number of APs.

The Tx-power for the AP and the STA could vary depending on the country and/or regulatory limits, hardware (HW) and/or board limits, and the channel mode and/or usage as described in IEEE 802.11 specification. In general, wall-mounted APs would have better Tx-power over an STA, due in part to battery and/or power usage limitations of the STA. Therefore, the RSSI for the APs computed by the STA would be higher than the RSSI for the STA computed by APs due to the Tx-power differences at the APs and the STA. This Tx-power imbalance, or difference between the APs and STA, sometimes can lead to connectivity and/or data stall problems, especially in low-RSSI regions where STA can receive all the packets from APs because of the higher Tx-power usage at the APs, but the APs receives little or no frames from the STA due to the lower Tx power usage at the STA end.

Generally, when STA determines a Tx power value from the AP is below a threshold Tx power value or threshold RSSI, the STA will trigger a low RSSI roaming operation in which the STA will attempt to determine whether the STA can connect to any other AP with a better (e.g., higher) Tx power value or higher RSSI, respectively. Under such a condition when the STA receives an acceptable Tx power value from the connected AP (e.g., above the threshold Tx power value), the STA may not be able to trigger a low-RSSI roam since the AP RSSI at the STA can still be better than a low-RSSI roam threshold configuration at the STA. In such a case, the STA does not initiate a roaming process and remains connected to the AP, although the data connectivity from STA to AP is already deteriorated or broken, while the STA neither attempts to roam to any better available AP nor falls back to mobile-data connectivity, for example, long-term evolution (LTE) connectivity or other cellular connectivity.

The subject technology enables an STA roaming-to-infrastructure BSS network created by several APs to compute a normalized RSSI for the APs, and use the normalized RSSI for making roam decisions, and a target AP selection without experiencing poor data connectivity and data stall issues.

FIG. 1 is a block diagram illustrating a wireless environment 100 within which some aspects of the subject technology are implemented. The wireless environment 100 includes a number of network devices such as APs for network connectivity including, but not limited to, an AP 110-1, an AP 110-2, and an AP 110-3, and an electronic device 120 (e.g., an STA). Each of the APs 110-1, 110-2, and 110-3 can create a BSS network for the electronic device 120 to join. The electronic device 120 can be a mobile communication device such as a phone (e.g., a smartphone), a tablet, or any other mobile communication device. The electronic device 120 roams to find the best AP among the available APs 110-1, 110-2, and 110-3 to find an AP with an RSSI better than the low-RSSI roam threshold set in its configuration. The electronic device 120, due to battery and/or power usage limitations, can have a lower Tx-power than the Tx-power of any of the APs 110-1, 110-2, and 110-3. Therefore, the RSSI associated with any of the APs 110-1, 110-2, and 110-3 at the electronic device 120 can be better than the low-RSSI roam threshold set in the configuration of the electronic device 120.

For example, the electronic device 120 may include a radio circuit connected to an AP, such as the AP 110-1, although the data connectivity from electronic device 120 to the AP 110-1 is deteriorated or broken. This may occur while the electronic device 120 is not aware of it, and thus the electronic device 120 does not initiate a roaming process to find another AP. In other words, the electronic device 120 stays connected to the AP 110-1, although the data connectivity from electronic device 120 to AP 110-1 is already deteriorated or broken, without the electronic device 120 attempting to roam to any better available AP (e.g., APs 110-2 or 110-3) or falling back to mobile-data connectivity.

Aspects of the subject technology provide a solution for this problem by enabling the electronic device 120 to compute a normalized RSSI for the APs 110-1, 110-2, and 110-3, and use the normalized RSSI for making roam decisions, and selecting a target AP without experiencing poor data connectivity and data stall issues.

Figure 2:
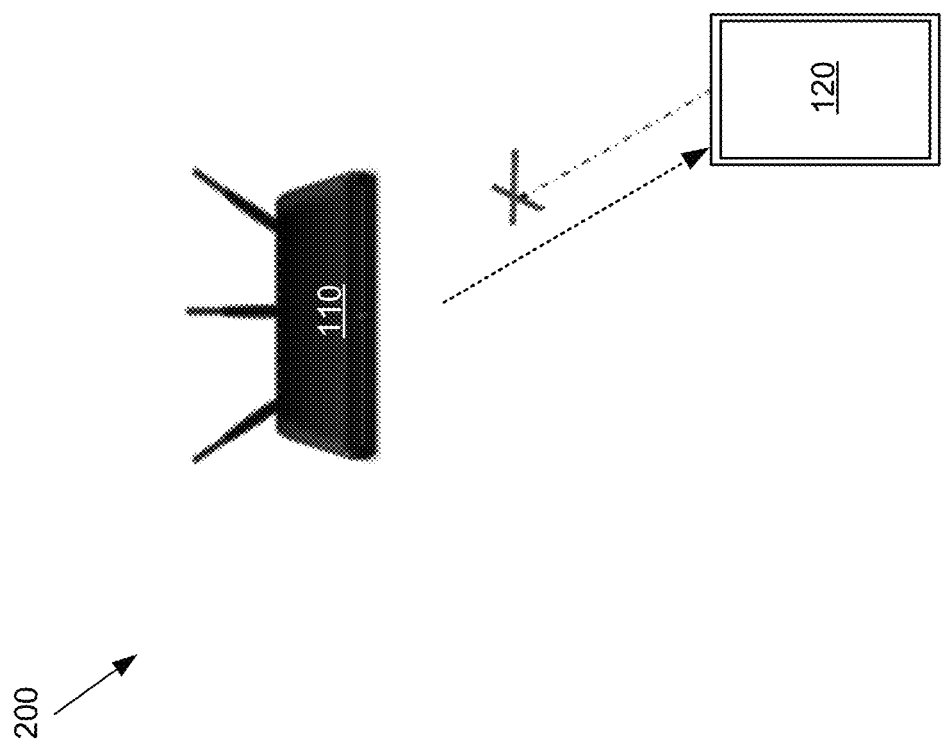
FIG. 2 is a schematic diagram illustrating an example of a communication scenario between an access point and a client station addressed by aspects of the subject technology.

FIG. 2 is a schematic diagram illustrating an example of a communication scenario 200, between an AP 110 and the electronic device 120 addressed by certain aspects of the subject technology. The communication scenario 200 shows an example, in which the AP 110 fails to receive the frames sent by the electronic device 120, as explained herein. In the example, the AP 110 creates an infrastructure BSS with 32 decibels (dB) as the AP Tx power (or TX power value), and the electronic device 120 uses 12 dB as the Tx power (or Tx power value). A Tx power value used by the electronic device 120, and other electronic devices shown and described herein, may be referred to as an electronic device Tx power value. In this case, considering the same path loss and/or distance at either direction between the AP 110 and the electronic device 120, the RSSI of electronic device 120 at the AP 110 is about −90 decibel-milliwatts (dBm), whereas the RSSI of AP 110 at the electronic device 120 is −70 dBm. In this situation, the electronic device 120 can receive all the frames from AP 110, as the AP 110 is using higher Tx-power compared to the electronic device 120, and the packets from AP 110 are received at electronic device 120 with a better RSSI than packets received from the electronic device 120 at the AP 110. This results in the frames from the electronic device 120 not being received at the AP 110 because the Tx-power of the electronic device 120 is low (12 dB), and the signal strength associated with the packets sent from the electronic device 120 would be too low at the AP 110.

For the electronic device 120, the low RSSI roam threshold (or threshold power value) may be configured to −75 dBm. Thus, the electronic device 120 may not even start the roaming scans to find a stronger RSSI than that of the AP 110 that is −70 dBm (at the electronic device 120), which is higher than the configured RSSI roam threshold (−75 dBm) of the electronic device 120. Therefore, there is a high probability that the electronic device 120 will remain in this state without having any uplink data connectivity if the electronic device 120 is not moved and remains idle in the same low RSSI region for a longer time. This situation can be resolved by certain aspects of the subject technology, as discussed in more detail herein.

Figure 3:
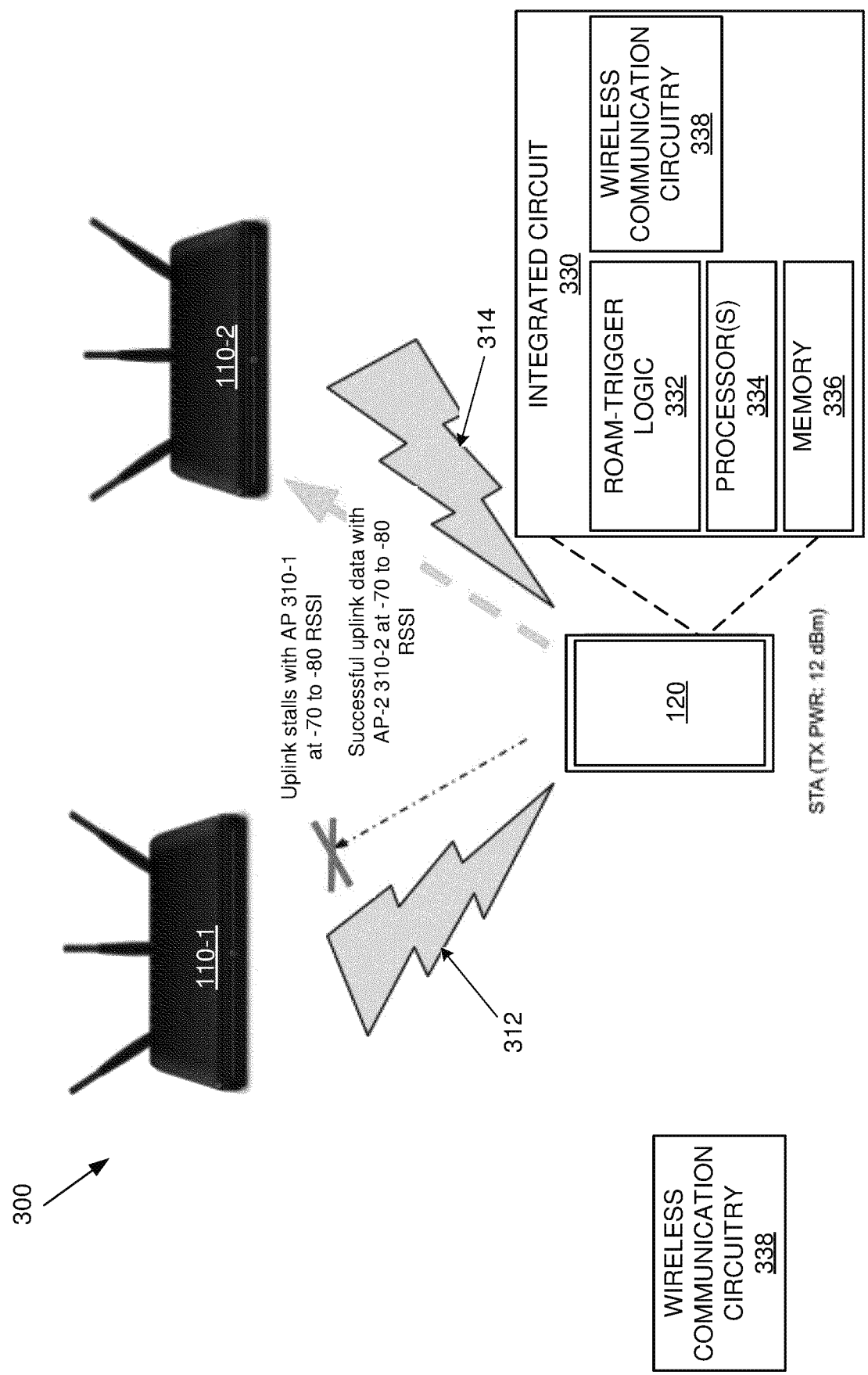
FIG. 3 is a schematic diagram illustrating an example communication scenario where a client station selects an access point to join with based on a normalized received-signal strength indicator, according to aspects of the subject technology.

FIG. 3 illustrates a schematic diagram illustrating a communication scenario 300, where an electronic device 320 can select from multiple network devices, such as an AP 310-1 and an AP 310-2, to join with based on a value of a normalized RSSI, according to aspects of the subject technology. The electronic device 320 may obtain information from the AP 310-1 and the AP 310-2 through a connection 312 and a connection 314, respectively. According to some aspects of the subject technology, the electronic device 320 can overcome the poor data connectivity and data stall issues discussed above by computing a normalized RSSI for the APs based on the Tx power usage difference between APs and the electronic device and use the normalized RSSI for making roam decisions and target AP selections while joining or roaming to the infrastructure BSS networks. In order to achieve this target AP selection, the APs 310-1 and 310-2 can autonomously include a Tx-power used (TPU) field. In this manner, the electronic device 320 can use this information to derive the normalized RSSI. The normalized RSSI is based on a Tx-power delta between an electronic device and a respective AP (e.g., the electronic device 320 and APs 310-1 and 310-2).

According to the IEEE 802.11 spec section 9.4.1.20, mentioned above, the TPU field is a 2s complement signed integer. It is less than or equal to the maximum transmit power, and indicates the actual power used as measured at the antenna connector, in units of dBm, by an electronic device when transmitting the frame containing the TPU field. The TPU value is determined at any time prior to sending a frame in which the TPU field is contained and has a tolerance of ±5 dBm.

In some embodiments, the electronic device 320 includes an integrated circuit 330, which can, for example, include, but is not limited to, a roam-trigger logic circuit 332, one or more processors 334, and a memory 336, and wireless communication circuitry 338. The memory 336 includes instructions (e.g., executable instructions) and the one or more processors 334 is operatively coupled to the memory 336. The phrase "operatively coupled" refers to at least a communicative coupling in which the one or more processors 334 and the memory 336 can send and receive information (e.g., data) to each other. Accordingly, the one or more processors 334 can receive executable instructions from the memory 336 and carry out steps of the executable instructions. As non-limiting examples, the one or more processors 334 may include one or more microcontrollers, a MEMS controller, or a programmable-based controller. The wireless communication circuitry 338 may include a controller(s) and antenna(s) used to communicate (e.g., send and receive) information (e.g., RSSI and Tx power value information) to and from the APs 310-1, 310-2, and 310-3.

In the example, the AP 310-1 uses a Tx-power of 32 dBm, and the AP 310-2 uses a Tx-power of 20 dBm. The RSSI at electronic device 320 of the APs 310-1 and 310-2 can, for example, be −66 dBm and −68 dBm, respectively. The power used by the APs 310-1 and 310-2 can be transmitted to the electronic device 320 in respective frames from the APs 310-1 and 310-2, respectively. In this scenario, ideally, the electronic device 320 would prefer to join the network of AP 310-1 because the RSSI of AP 310-1 is better than the RSSI of AP 310-2 (−66 dB compared to −68 dB). But when the electronic device 320 associates to AP 310-1, it is possible that there would be poor uplink data connectivity and data stall issues in early low-RSSI regions (e.g., within −70 dB to −75 dB). This is because when the RSSI of the AP 310-1 at electronic device 320 is in the early low-RSSI regions, the AP 310-1 may receive little or no packets from the electronic device 320 since by the time the RSSI at the electronic device 320 of AP 310-1 is within about −70 dB to −75 dB, the RSSI of the electronic device 320 at the AP 310-1 would be already within −90 dB to −95 dB. This follows the fact that the Tx-power used in electronic device 320 is 20 dBm lower than the Tx-power used in AP 310-1. Under this condition, the electronic device 320 may not be able to successfully deliver any data frames to the AP 310-1, and the electronic device 320 would not be starting a low-RSSI roam as well, since the RSSI of AP 310-1 at the electronic device 320 still may not be meeting the low-RSSI roam-trigger threshold configured for electronic device 320. In the subject technology, however, the one or more processors 334 of the integrated circuit 330 executes the instructions stored in the memory 336, which causes the one or more processors 334 to perform the following exemplary steps: 1) obtain a first normalized RSSI including a first difference between a first Tx power value of the first network device (AP 310-1) and a Tx power of the electronic device 320; 2) obtain a second normalized RSSI including a second difference between a second Tx power value of a second network device (AP310-2) and the Tx power of the electronic device 320; 3) compare the first normalized RSSI with the second normalized RSSI, and 4) select, from the first network device (AP310-1) and the second network device (AP310-2), a network device associated with a greater of the first normalized RSSI based on the specified Tx power value and the second normalized RSSI. A "specified Tx power value" may refer to Tx power value set by a manufacturer of the AP or an actual Tx power value obtained by the electronic device (e.g., electronic device 320. The roam-trigger logic circuit 332 in the electronic device 320 can use this normalized RSSI to start a target-selection decision making in order for the electronic device 320 to overcome the poor data connectivity/data stall problems caused by the Tx-power usage imbalance between the electronic device and APs 310-1 and 310-2, especially in the low-RSSI regions. The term "obtain" or "obtaining" may refer to the electronic device 320, including at least some of the described components (e.g., one or more processors 334), receiving information (e.g., RSSI value, Tx power value, RSSI normalized value) and/or calculating information that is received.

In one or more implementations, prior to obtaining the first normalized RSSI, the one or more processors 334 may obtain the first Tx power value from the AP 310-1, compare the first Tx power value with a threshold Tx power and in response to the first Tx power value being lower than the threshold Tx power value, cause the roam-trigger logic circuit 332 to initiate a roaming operation to obtain the second Tx power value from the AP 310-2. In some implementations, the one or more processors 334 compares the first RSSI with a threshold RSSI; and when the second normalized RSSI is greater than the first RSSI, causes the electronic device 320 to leave the AP 310-1 and join the AP 310-2.

In some implementations, the one or more processors 334 obtains from the AP 310-1 a received frame including a specified Tx power of the first network device. For instance, the one or more processors 334 may select the network device during the roaming operation. For instance, when the electronic device 320 is joined with the AP 310-1, in response to the second normalized RSSI (based on the AP 310-2) being greater than the first normalized RSSI (based on the AP 310-1), the one or more processors 334 causes the electronic device 320 to leave the AP 310-1 and join the AP 310-2. In some aspects, the first Tx power value obtained by the one or more processors 334 can be a perceived Tx power value determined by the electronic device 320.

In some implementations, the one or more processors 334 can determine (compute) and apply a normalized RSSI for the AP 310-1 and the AP 310-2 during the join/roam target selection decision making based on the Tx-power usage difference between each of the AP 310-1 and the AP 310-2, and the electronic device 320. The determined normalized RSSI of AP 310-2 turns out to be significantly better than the normalized RSSI of AP 310-1. The normalized RSSI can be determined by the following:

$$\text{Normalized AP RSSI} = \text{Actual AP RSSI} - (\text{AP Tx power} - \text{electronic device Tx power}) \qquad \text{Eq. 1}$$

For example, based on the above information, the normalized RSSI for AP 310-1 is −86 dB (i.e., −66 dB−(32 dBm−12 dBm)) and the normalized RSSI for AP 310-2 is −76 dB (i.e., −68 dB−(20 dBm−12 dBm)). Accordingly, a radio (not shown in FIG. 3 for simplicity) of the electronic device 320 would join the network of AP 310-2 that has a higher value of normalized RSSI, and it would be highly unlikely that poor uplink performance or the data stall problem would ever occur at the low-RSSI regions (e.g., within −70 dB to −85 dB), as the Tx-power delta between the AP 310-2 and the electronic device 320 is less compared to the Tx-power delta between the AP 310-1 and the electronic device 320. This causes the low-RSSI roam trigger condition to occur before the electronic device 320 experience any data connectivity/stall issues. At this point, the roam-trigger logic circuit 332 of the electronic device 320 sends an interrupt to the one or more processors 334 to cause the electronic device 320 to join the network of the AP 320-2.

Furthermore, if the normalized RSSI is used in the AP 310-1 associated scenario, then the electronic device 320 would have started the low-RSSI roam and roamed to a better AP well before the electronic device 320 runs into the poor data connectivity and data stall problems in the low-RSSI regions. Therefore, computing and applying the normalized RSSI, as described herein, helps to overcome the poor data connectivity and data stall occurrences that can be caused by Tx-power imbalance/differences between the STAs and APs.

Aspects of the subject technology include a number of advantageous features including, but not limited to, better data connectivity experience even at low-RSSI regions irrespective of the Tx-power imbalance/difference between APs and an STA, quicker reconnection to the better available APs, and overcoming prolonged poor-data connectivity in the low-RSSI regions due to Tx-power imbalance/difference between APs and the STA.

Figure 4:
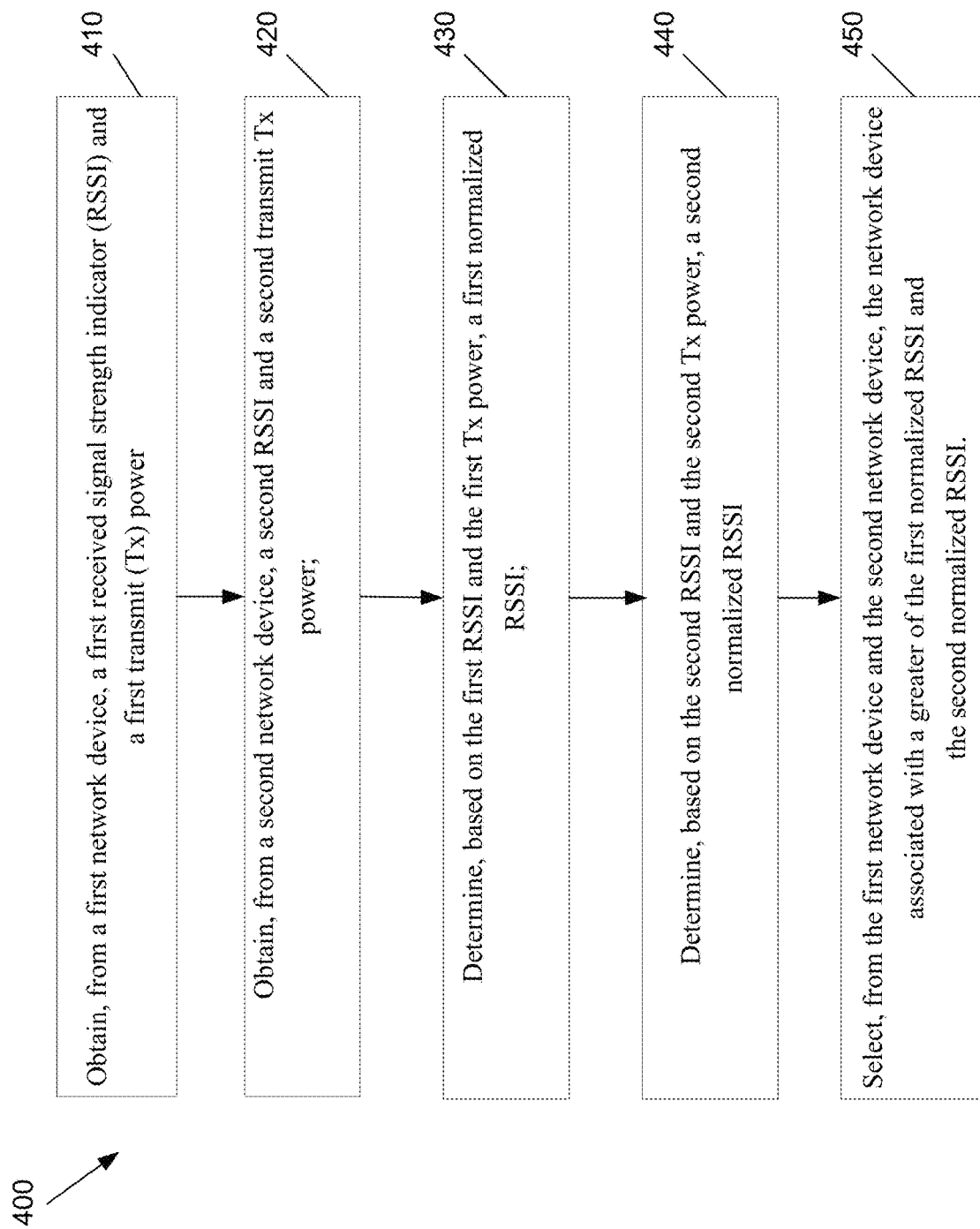
FIG. 4 is a flow diagram illustrating an example of a method for enhancing data connectivity, according to aspects of the subject technology.

FIG. 4 is a flow diagram illustrating an example of a method 400 for enhancing data connectivity, according to aspects of the subject technology. The method 400 starts at operation block 410, where an integrated circuit (e.g., integrated circuit 330 of FIG. 3) of a station (e.g., electronic device 320 of FIG. 3) obtains a first RSSI and a first Tx power (e.g., connection 312 of FIG. 3) from a first network device (e.g., AP 310-1 of FIG. 3) (block 410). A second RSSI and a second transmit Tx power (e.g., connection 314 of FIG. 3) is received from a second network device (e.g., AP 310-2 of FIG. 3) (block 420). A first normalized RSSI is determined based on the first RSSI and the first Tx power (block 430). A second normalized RSSI is determined based on the second RSSI and the second Tx power (block 440). The network device (e.g., AP 310-2 of FIG. 3) associated with a greater of the first normalized RSSI and the second normalized RSSI is selected from the first network device and the second network device (block 450).

Figure 5:
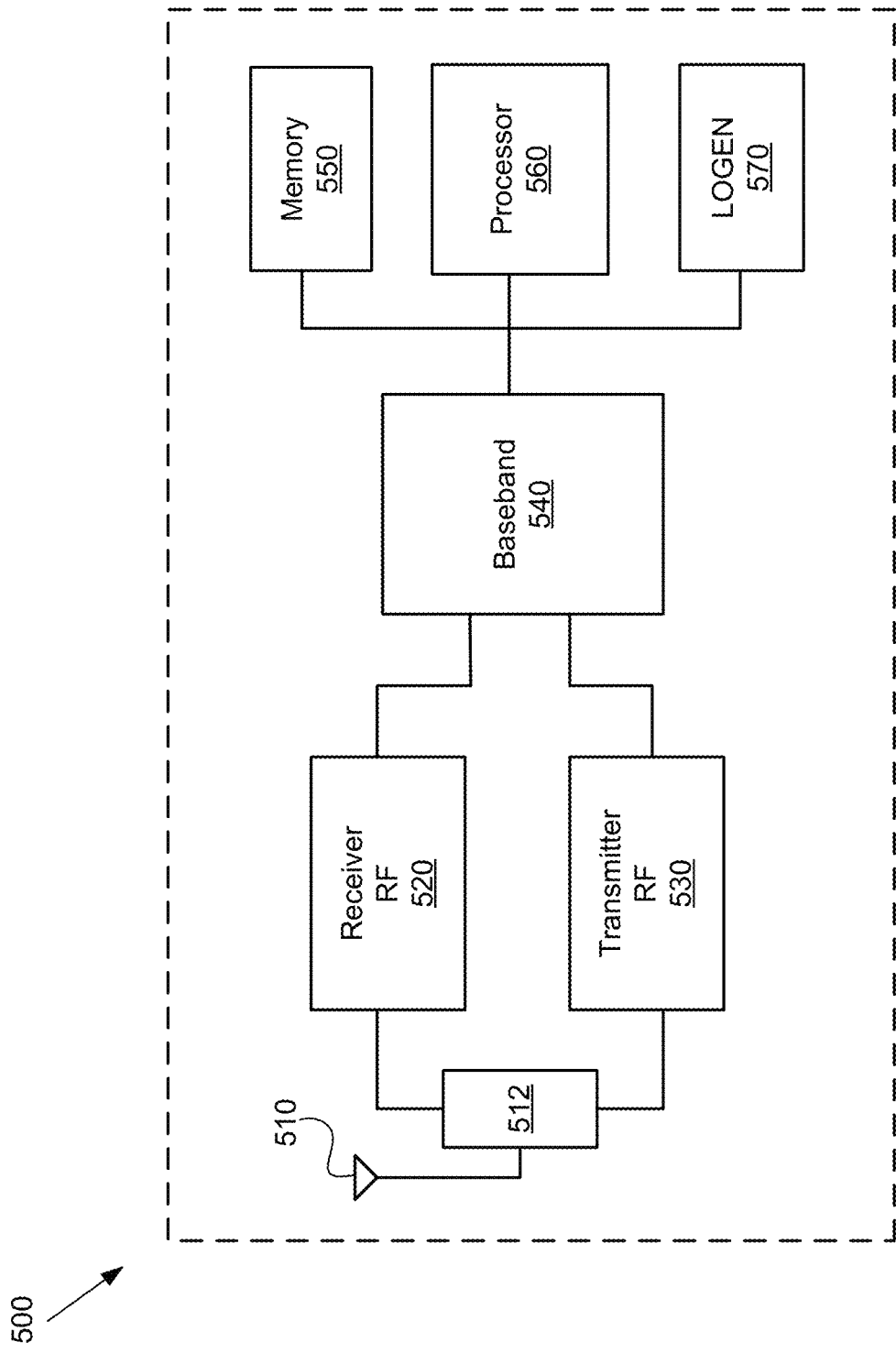
FIG. 5 is a block diagram illustrating an electronic system within which aspects of the subject technology are implemented.

FIG. 5 is a block diagram illustrating an electronic system within which aspects of the subject technology are implemented. FIG. 5 illustrates an example wireless communication device 500, in accordance with one or more implementations of the subject technology. In some aspects, the wireless communication device 500 may represent an STA or AP of the subject technology as described with respect to FIG. 3. The wireless communication device 500 may comprise a radio frequency (RF) antenna 510, a receiver 520, a transmitter 530, a baseband processing module 540, a memory 550, a processor 560, and a local oscillator generator (LOGEN) 570. In various embodiments of the subject technology, one or more of the blocks represented in FIG. 5 may be integrated on one or more semiconductor substrates. For example, the blocks 520-570 may be realized in a single chip or a single system on chip or may be realized in a multi-chip chipset.

The RF antenna 510 may be suitable for transmitting and/or receiving RF signals (e.g., wireless signals) over a wide range of frequencies. Although the RF antenna 510 represents a single antenna as illustrated, the subject technology is not so limited.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards. Wi-Fi, WiMAX, Bluetooth, and various cellular standards. In various embodiments of the subject technology, the receiver 520 may not require any SAW filters, and few or no off-chip discrete components, such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals, and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards. In some implementations, the baseband processing module 540 may include a roam-trigger module (e.g., roam-trigger logic 332 of FIG. 3) to perform the functionalities as described above with respect to FIG. 3.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfers of data between various portions of the wireless communication device 500. Additionally, the processor 560 may enable implementation of an operating system or otherwise execute code to manage operations of the wireless communication device 500. In some implementations, the processor 560 may execute some or all the functionalities of the processor 338 of FIG. 3 as described above with respect to FIG. 3.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiment of the subject technology, information stored in the memory 550 may be utilized for configuring the receiver 520, and/or the baseband processing module 540.

The local oscillator generator (LOGEN) 570 may comprise suitable logic, circuitry, interfaces, and/or code that may be operable to generate one or more oscillating signals of one or more frequencies. The LOGEN 570 may be operable to generate digital, and/or analog signals. In this manner, the LOGEN 570 may be operable to generate one or more clock signals, and/or sinusoidal signals. Characteristics of the oscillating signals such as the frequency and duty cycle may be determined based on one or more control signals from, for example, the processor 560, and/or the baseband processing module 540.

In operation, the processor 560 may configure the various components of the wireless communication device 500 based on a wireless standard according to which it is desired to receive signals. Wireless signals may be received via the RF antenna 510 and amplified and down-converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only, and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component, may also mean the processor being programmed to monitor and control the operation or the processor being operable to monitor and control the operation. Likewise, a processor configured to execute code can be construed as a processor programmed to execute code, or operable to execute code.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as "example" is not necessarily to be construed as preferred or advantageous over other aspects or designs.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise", as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An integrated circuit for an electronic device, the integrated circuit comprising:
   a memory that stores instructions; and
   one or more processors coupled to the memory, wherein executing the instructions causes the one or more processors to:
      obtain a first received signal strength indicator (RSSI), the first RSSI comprising an RSSI from a first network device minus a first difference between a first transmit (Tx) power value of the first network device and an electronic device Tx power value,
      obtain a second RSSI, the second RSSI comprising an RSSI from a second network device minus a second difference between a second Tx power value of the second network device and the electronic device Tx power value,
      compare the first RSSI with the second RSSI, and
      select, from the first network device and the second network device, a network device associated with a greater of the first RSSI and the second RSSI.

2. The integrated circuit of claim 1, wherein executing the instructions further causes the one or more processors to obtain, from the first network device, a received frame, wherein the received frame comprises a specified Tx power value of the first network device.

3. The integrated circuit of claim 2, wherein the first RSSI is further based on the specified Tx power value.

4. The integrated circuit of claim 2, wherein executing the instructions further causes the one or more processors to, prior to obtaining the first RSSI:

obtain the first Tx power value from the first network device;

compare the first Tx power value with a threshold power value; and in response to the first Tx power value being lower than the threshold power value, initiate a roaming operation to obtain the second Tx power value from the second network device.

5. The integrated circuit of claim 4, wherein executing the instructions further causes the one or more processors to select, during the roaming operation, the network device.

6. The integrated circuit of claim 4, wherein executing the instructions causes the one or more processors to, in response to the electronic device is joined with the first network device and in response to the second RSSI being greater than the first RSSI:
leave the first network device; and
join the second network device.

7. The integrated circuit of claim 1, wherein executing the instructions causes the one or more processors to obtain the first Tx power value comprises obtaining a perceived Tx power value as determined by the electronic device.

8. The integrated circuit of claim 1, wherein executing the instructions that causes the one or more processors to obtain the first Tx power value from the first network device comprises receiving the first Tx power value from a first access point.

9. The integrated circuit of claim 8, wherein executing the instructions that causes the one or more processors to receive the second Tx power value from the second network device comprises receiving the second Tx power value from a second access point different from the first access point.

10. An integrated circuit for an electronic device, the integrated circuit comprising:
a memory that stores instructions; and
one or more processors coupled to the memory, wherein executing the instructions causes the one or more processors to:
join a first network device;
receive, from the first network device, a first frame, wherein the first frame comprises a first transmit (Tx) power value;
receive, from a second network device, a second frame, wherein the second frame comprises a second Tx power value;
obtain i) a first difference between the first Tx power value and a device Tx power value of the electronic device, ii) a second difference between the second Tx power value and the device Tx power value, iii) a first normalized received signal strength indicator (RSSI) comprising an RSSI from the first network device minus the first difference, and iv) a second normalized RSSI comprising an RSSI from the second network device minus the second difference; and
in response to the second Tx power value being less than the first Tx power value:
leave the first network device; and
join the second network device.

11. The integrated circuit of claim 10, wherein executing the instructions causes the one or more processors to, prior to receiving the first frame:

compare the first Tx power value with a threshold power value; and in response to the first Tx power value being less than the threshold power value, initiate a roaming operating to obtain the second frame.

12. The integrated circuit of claim 10, wherein the first normalized RSSI is further based on the first difference and a specified Tx power value of the first network device.

13. The integrated circuit of claim 12, wherein the second normalized RSSI is further based on the second difference and the specified Tx power value.

14. The integrated circuit of claim 13, wherein executing the instructions causes the one or more processors to, in response to the second normalized RSSI being greater than the first normalized RSSI, leave the first network device.

15. The integrated circuit of claim 10, wherein executing the instructions causes the one or more processors to obtain a perceived Tx power value as determined by the electronic device.

16. A method for enhancing data connectivity, the method comprising:
obtaining, from a first network device, a first received signal strength indicator (RSSI) and a first transmit (Tx) power value;
obtaining, from a second network device, a second RSSI and a second transmit Tx power value;
determining a first normalized RSSI comprising the first RSSI minus a first difference between the first Tx power value and an electronic device Tx power value;
determining a second normalized RSSI comprising the second RSSI minus a second difference between the second Tx power value and the electronic device Tx power value; and
selecting, from the first network device and the second network device, a network device associated with a greater of the first normalized RSSI and the second normalized RSSI.

17. The method of claim 16, wherein:
the first normalized RSSI is further based on an electronic device Tx power value associated with an electronic device, and
the second normalized RSSI is further based on the electronic device Tx power value.

18. The method of claim 16, further comprising, subsequent to obtaining the first RSSI:
comparing the first RSSI with a threshold RSSI; and
in response to the first RSSI being less than the threshold RSSI, initiating a roaming operating to obtain the second RSSI.

19. The method of claim 16, further comprising, when joined with the first network device and in response to the second normalized RSSI being greater than the first RSSI:
leaving the first network device; and
joining the second network device.

20. The method of claim 16, further comprising:
receiving a first specified Tx power value from the first network device, wherein the first normalized RSSI is based on the first specified Tx power; and
receiving a second specified Tx power value from the second network device, wherein the second normalized RSSI is based on the second specified Tx power.

* * * * *